Feb. 24, 1970  A. G. WEBER ET AL  3,497,011
PREVENTION OF OIL WELL CONING BY MOBILITY REDUCTION
Filed Feb. 7, 1968

ALVIN G. WEBER   INVENTORS
ALAN D. MODINE

BY

ATTORNEY

United States Patent Office 3,497,011
Patented Feb. 24, 1970

3,497,011
PREVENTION OF OIL WELL CONING BY
MOBILITY REDUCTION
Alvin G. Weber and Alan D. Modine, Houston, Tex., assignors to Esso Production Research Company, a corporation of Delaware
Filed Feb. 7, 1968, Ser. No. 703,631
Int. Cl. E21b 43/12
U.S. Cl. 166—306                                    11 Claims

ABSTRACT OF THE DISCLOSURE

In the production of oil, coning of undesired fluids, gas or water, is reduced by perforating the zone containing the undesired fluid near the oil zone and at a second, more remote location. A fluid which will reduce the mobility of the undesired fluid is injected into the remote perforations and circulated out the near perforations, thereby creating low pressure in the zone containing the undesired fluids and reduced mobility of the undesired fluids.

BACKGROUND OF THE INVENTION

Field of the invention

This invention relates to the field of processes for treating oil wells where a fluid is injected into and circulated through a subterranean formation to reduce the production of undesired fluids.

Description of the prior art

Producible petroleum occurs in porous and permeable subterranean formations. The petroleum almost never occurs alone; it is generally associated with formation water and gas. These three fluids, gas, oil, and water, are mobile and tend to segregate within a formation on the basis of their respective densities due to the force of gravity. Generally, an upper zone of the formation will be primarily saturated with gas, an intermediate zone with oil, and a lower zone with water.

Petroleum can almost never be produced alone. The oil is invariably contaminated with water or gas, and generally both. Even in the ideal situations where there are no zones in the formation which are saturated with gas or water, or the oil saturated zone is so thick that the overlying gas zone and underlying water zone are substantially unaffected by production from the oil zone, certain limited quantities of solution gas and connate water will be present in the oil zone and produced with the oil. Contamination of the oil production by undesired fluids, gas and water, creates operational and economic difficulties in oil production.

Water and gas coning are producing conditions which accentuate the contamination of the produced oil. When water and gas coning occurs, the quantity of undesired fluid in the production stream is radically increased.

Coning is the vertical movement of water or gas from a zone which is saturated by the undesired fluid into the oil-saturated zone. Coning is a more serious problem than production of connate water and solution gas for the sole reason that greater quantities of the contaminating fluids are present to interfere with the oil production.

When a well is drilled into an oil-bearing formation, it generally also penetrates the zones of the formation which are saturated with gas and water. In order to control the production of fluids from the formation, a steel pipe well or casing is run into the wellbore and the exterior of the casing is cemented to the interior of the wellbore. The casing is perforated at the point where the formation is saturated with oil, as previously determined by electric logging means or similar techniques. Perforation of the casing can be accomplished by any number of methods and is simply a means for making holes in the casing and cement to obtain fluid communication between the formation and the interior of the casing.

After the casing has been perforated and small diameter pipe or tubing has been placed in the casing for a fluid conduit, the pressure in the casing is reduced below the formation pressure. The driving force which expels oil from the formation and into the wellbore, is the pressure differential existing between the formation and wellbore.

As oil is produced from the formation, a pressure sink or zone of low pressure is created in the immediate vicinity of the wellbore. This pressure sink is the cause of coning. The gas in overlying zones of gas saturation and the water in underlying zones of water move into the area of low pressure around the wellbore. Gas and water are able to overcome the force of gravity and move vertically to the perforations in the oil producing zone because these fluids generally have a lower viscosity than the reservoir oil. These cones of gas and water not only cause the amount of the contaminants in the produced fluids to rise but also reduce the volume of oil which can be produced from the previously oil saturated zone.

In addition to reducing oil production, coning of gas and water into an oil-producing interval presents other detrimental effects. Where oil, gas, and water are produced together, the gas and water must be removed before sale of the oil to the pipeline. The cost of surface separation equipment, including the equipment and materials necessary to break emulsions which tend to form between oil and water is often a major expense in the production of petroleum. Moreover, there are often disposal problems associated with the gas and water. The produced water is an unsalable by-product of production and often separate wells must be drilled solely for the purpose of reinjecting the water into the earth. If there is no available market for the gas, it must be disposed of by flaring or reinjection into subterranean formations.

Where the wells have insufficient natural energy to flow to the surface, subsurface pumps must be used to lift the fluid from the bottom of the well to the surface. The lifting cost of pumping oil production to the surface can be greatly increased when water is produced with the oil since this cost is related to the volume of fluid produced. Furthermore, since gas is a compressible fluid, its presence in the produced fluid interferes with the action of the positive displacement pumps most commonly used in oil production.

Under the conservation laws in many states, the production from wells having high gas-oil ratios is sharply restricted. Thus, the production of gas, which could otherwise be curtailed, results in a governmental restriction on the amount of oil which can be produced from a well. The production of gas also wastes natural reservoir energy which is available to move the oil from the formation and into the wellbore.

As has been previously stated, the mere presence of either gas or water in the oil-producing interval will decrease the ability of the oil to flow in the formation. The relative permeability of the formation to oil, which is a measure of the ability of the oil to flow through the formation, is reduced by the presence of other fluids, such as gas or water. Gas and water coning can reduce the relative permeability to oil to the point where oil can no longer be economically produced.

One of the commonly known methods of reducing coning is cement squeezing. In the cement squeeze method, the casing is perforated at or near the oil-water contact and a cement slurry under high pressure is forced through the perforations and into the formation. Due to the high pressure of injection, the formation is generally fractured and the cement slurry fills the resulting fracture. Upon solidification the cement forms an impermeable barrier to the water in the immediate vicinity of the wellbore and thereby tends to prevent water coning. This method has, however, a number of inherent drawbacks. The technique depends upon forming a nearly horizontal, continuous, impermeable barrier which extends into the formation to a distance where coning is not likely to occur. It is difficult, if not impossible, in some instances to form horizontal fractures. Where the fracture system is vertical, it is ineffective in blocking the vertical flow of water. Moreover, there is no assurance that the cement barrier will extend into the formation by a uniform distance in all directions. In those directions where the barrier extends for only a short distance into the reservoir, coning may still occur.

Another method which has been suggested is perforation of both the oil-producing interval and the water-producing interval. In this method both perforated intervals are produced simultaneously and the water which would otherwise cone into the oil-producing interval is withdrawn from the perforations in the water zone below the oil-water contact. While this method has the ability to decrease coning, excessive amounts of formation water are produced resulting in high lifting costs and surface disposal problems.

It has also been suggested that a partial plugging agent such as napthalene may be squeezed into perforations in the water zone to reduce the production of water. This method shows some merit but the semipermeable bank may tend to break down over a period of time. As water is produced through this region, small quantities of the plugging agent will be concurrently produced. Over a period of time, channels of high water permeability may develop and water production will further increase. The increased water production hastens the erosion of the water barrier further aggravating the condition. Before long, water production may exceed acceptable limits.

SUMMARY OF THE INVENTION

It has been found that coning of an undesired fluid into an oil-productive interval can be reduced or eliminated by circulating a mobility reducing fluid through the zone containing the undesired fluid. To accomplish this circulation, the zone containing the undesired fluid is perforated at two locations. One location is at or near the oil-saturated zone; the second is more remote from the oil zone. The mobility reducing fluid is injected into the remote perforations, through the formation, and out the near perforations.

To prevent either water or gas coning, a mobility reducing fluid is injected into the more remote set of perforations and produced out of the perforations nearest the oil productive zone. In each instance, the injected fluid reduces the ability of the undesired fluid to flow from its zone of saturation to the perforations nearest the oil productive zone. However, the injected fluid does not change the pressure differential between the saturated zone and the perforations in the oil zone; therefore, the undesired fluids will continue to flow toward the perforations but at a reduced rate and without coning into the oil zone.

DESCRIPTION OF THE PREFERRED EMBODIMENT

Figure 1:
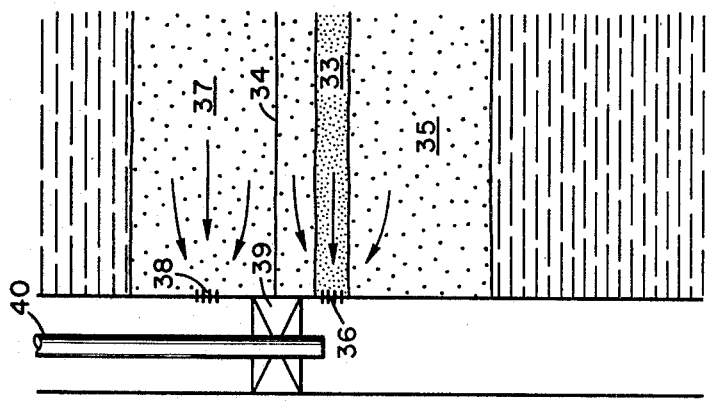
FIGURE 1 shows a diagrammatical cross-section of a conventional oil well drilled into a subsurface formation in which a water zone underlies an oil producing zone.

The practice of this invention can be more clearly seen with reference to the accompanying drawings. Referring to FIGURE 1, a porous, permeable subterraneon formation shown generally at 10 is penetrated by a wellbore 11 in which a string of casing 12 has been run and cemented. The formation 10 has a zone 13 saturated with oil and a lower zone 14 which is saturated with water. Under conventional producing procedures, the casing is perforated 15 in the oil saturated section of the horizon to create fluid communication between the oil saturated interval 13 and the wellbore 11. When the pressure within the wellbore is less than the reservoir pressure, the reservoir fluids will be forced toward perforations 15.

The tendency for a given fluid, oil or water, to move to the perforations is a function of the force asserted on the fluid due to the pressure differential between the perforations and the fluid saturated zone, the force of gravity asserted on the fluid due to its density, and the mobility of the fluid within the formation. The mobility of a fluid is proportional to the relative permeability of the formation to that fluid and inversely proportional to the viscosity of the fluid.

Where the perforations in the oil-saturated zone are near the water saturated zone or the oil is highly viscous, there is a tendency for the water to cone upward 17 toward the perforations. Even though water normally has a higher density than oil and must move against the force of gravity to reach the perforations, the viscosity of the water compared to that of oil can be low enough that it will overcome this offsetting factor and the water will cone toward the perforations. As the water saturation increases in the vicinity of the perforations, the relative permeability to oil decreases. Eventually, this water encroachment can entirely cut off economic oil production.

It has been found that the tendency of the water to cone into the oil saturated portions of the reservoir can be alleviated or substantially eliminated by perforating the water saturated zone at a location 18 just below the oil water contact and at another point 19 further below the oil-water contact. The withdrawal of fluid through perforations 18 and up production tubing 20 creates a zone of low pressure in the water zone at the immediate vicinity of the wellbore. This zone of low pressure tends to counteract the tendency of the oil-water interface 16 to cone toward the upper set of perforations 15.

A fluid containing a suitable thickening agent is injected down injection tubing 21 through perforations 19 and into the water saturated zone 14. Suitable packers 22 and 23 are set within the casing to isolate perforations 15, 18 and 19 from one another. The flow of the thickened water through the formation is shown generally by the flow arrows.

The mobility reducing fluid is produced through the near perforations 18 and up the production tubing 20 to the surface. If the produced fluid still retains its mobility reducing characteristics, it can be immediately reinjected through tubing string 21. It may be necessary to add additional quantities of thickening agent to the fluid before reinjection in some instances.

A primary advantage of this method over methods of the prior art is the tendency of the circulated, mobility-reducing fluids to seek out and travel through the more highly permeable streaks in the formation. The segments of the formation which are normally most productive of contaminating fluids will be the segments through which the mobility reducing fluid will most likely circulate. Thus, the mobility-reducing fluid is present at the location where it is most needed. Moreover, the continued circulation of this fluid tends to prevent development of zones of high productivity of contaminating fluids, since, as such zones develop more mobility reducing fluid will be drawn to and produced from such zones. Thus, there is continual, remedial activity which prevents excessive production of contaminating fluids.

Figure 2:
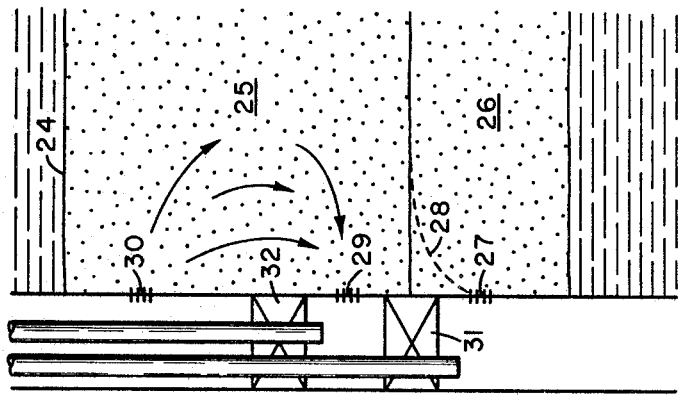
FIGURE 2 shows a diagrammatical cross-section of a conventional oil well drilled into a subsurface formation in which a gas zone overlies an oil producing zone.

FIGURE 2 illustrates how the method may be used to suppress gas coning into an oil-producing horizon. The producing horizon shown generally by reference numeral 24 has an upper gas saturated zone 25 and a lower oil saturated zone 26 which is perforated at 27. Using conventional producing techniques, the gas would have a tendency to cone down 28 into the oil saturated segment of the formation. By perforating the gas saturated segment of the producing horizon near the oil-water contact at 29 and at a second location 30 and circulating a mobility reducing material through the upper perforations and out the lower perforations, the tendency of the gas to cone into the oil producing zone may be reached. As a result, less gas is present at the oil perforations to impede oil production and the producing gas-oil ratio will also be reduced. Packers 31 and 32 are employed to isolate the sets of perforations from one another.

The mobility of a fluid in a porous medium is the ratio between the relative permeability of the medium to the fluid and the viscosity of the fluid. Thus, a suitable material for reducing mobility of the contaminating fluid may decrease the relative permeability of the formation to the contaminating fluid or may increase the viscosity of the fluid. Where gas coning is the problem being attacked, it is difficult to increase the gas viscosity and normally a reduction in the relative permeability of the formation to gas will be the method employed. Where gas coning is the problem, either permeability reduction or viscosity increase may be employed. In fact, some substances may perform both functions. The presence of the substances in the water may increase its viscosity, and the substances may adhere to the formation and reduce the formation's permeability.

A number of materials may be employed to reduce the mobility of the undesired fluid where the method is employed to alleviate water coning. Water containing soluble thickening agent or a viscous oil may be suitable. Any of the various known water soluble thickening agents may be added to provide a viscosity of 10 to 300 cps. and preferably from 25–100 cps. Viscosities outside these limits are sometimes operable but will generally be uneconomic. Suitable water soluble or water dispersing thickening agents include among others sulfonated polystyrene, polyacrylic amide, partially hydrolized polyacrylic amide, polyethylene oxide, polypropylene oxide, and polysaccharide biopolymers. These water soluble polymers may range in molecular weight from 500 to several million, and preferably from 50,000 to one million, depending upon the particular polymer chosen for use. Suitable polymer concentrations range from $\frac{1}{10}$ of one percent to as much as 5 percent by weight, the upper limit generally being one of economics.

Where an oil is used instead of a thickened aqueous solution, the fluid should have a viscosity of 2–300 cps. The oil may be injected as an oil-water emulsion to achieve the desired viscosity. Also surfactants which change the wettability of the formation may be used to lower the relative permeability of the formation to the undesired fluid.

Where the method is employed to alleviate gas coning, the preferred injection fluid is water, either fresh or field brine. Since the injected water will generally preferentially wet the surface of the rock, a minor amount of water will sharply decrease the permeability of the formation to gas. Alternately, a small quantity of oil may be employed to decrease the gas permeability of the gas saturated zone.

The preferred locations for the perforations in the zones of the formation will depend on a number of factors. Generally, it will be preferable to perforate the zone containing the contaminating fluid within a few feet of the oil zone. However, where the perforations in the oil zone are an appreciable distance from the contaminating zone, it may be desirable to place the first set of perforations in the contaminating zone further from the oil zone to prevent coning of oil into the contaminating zone. The remote perforations in the contaminating zone should be close enough to the first set of perforations to permit communication between the two sets of perforations without excessive injection pressure. The perforations in the contaminating zone should be preferably far enough removed to allow the injected fluid to invade the contaminating zone for an appreciable distance before being produced. Primary considerations in placing the perforations are the thickness of the oil, gas, and water zones, the vertical permeability of the formation, and the relative mobilities of the reservoir oil, contaminating fluids, and the mobility reducing fluid. The proper location for the perforations for a given set of conditions can readily be determined by those skilled in the art.

Figure 3:
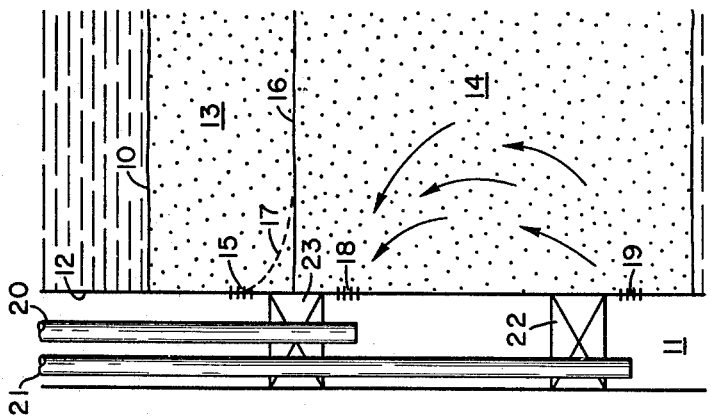
FIGURE 3 shows a diagrammatical cross-section of a conventional oil well drilled into a subsurface formation in which a water zone having a low permeability streak underlies an oil-producing zone.

An alternative method for reducing or eliminating water coning is shown in FIGURE 3. A naturally occurring streak of low permeability 33 near the oil-water contact 34 and the water saturated zone 35 is perforated 36. The oil saturated zone 37 is perforated 38 and a packer 39 is set in the wellbore to isolate the sets of perforations from each other. Water is produced through perforations 36 and into tubing string 40. Oil is produced through perforations 38 and up the annular space between the tubing and the wellbore. If desired, the oil may be produced through a second tubing string.

To substantially reduce water production, the permeability of the tight streak should preferably be no more than one-half the average permeability of the formation. Some benefit in reduction of water production will be obtained, however, so long as there is a measurable reduction in permeability in the tight streak. In some cases, the permeability of the tight streak may be as high as ninety percent of the average formation permeability. The presence and permeability of such tight streaks can be determined by conventional methods such as coring or logging.

In most instances, the tight streak should be relatively close to the oil-water contact to be most effective in reducing coning. Preferably, the tight streak should be no further below the oil-water contact than twice the distance between the oil-water contact and the perforations in the oil zone. However, greater separation can be tolerated in cases where conditions are proper, such as a large difference in density between oil and water. In any event, coning and water production may be reduced even though the perforations in the tight streak are too far below the oil-water contact entirely to eliminate water coning.

It should be understood that the method of this invention can be employed where the zones containing the desired and undesired fluids are separated by an impermeable barrier such as a shale bed. In such an instance, the undesired fluid may travel in any space existing between the wellbore and the casing. Such a space can occur due to improper cementing of the casing in the wellbore. Where the zones containing the desired and undesired fluids are close enough for fluid migration to be a problem, this problem can be alleviated by the method of this invention. Furthermore, although water coning is seldom a problem in gas production due to the high density and viscosity differential between the fluids, the method may also be employed to reduce this problem.

What is claimed is:

1. A method of reducing the production of undesired fluids and permiting the producing of desired fluids from a subterranean formation which has a first zone at least partially saturated with the desired fluids and an adjacent second zone at least partially saturated with the undesired fluid, the formation being penetrated by a wellbore which is in fluid communication with the first zone, comprising:

(a) establishing fluid communication between the wellbore and the second zone at a first point near the first zone;
(b) establishing fluid communication between the wellbore and the second zone at a point remote from the first zone;
(c) injecting a fluid to reduce the mobility of the undesired fluid at the second point of fluid communication;
(d) withdrawing the undesired fluid from the first point of fluid communication; and
(e) withdrawing the desired fluid from the first zone.

2. The method as defined in claim 1 wherein the desired fluid is oil.

3. The method as defined in claim 1 wherein the undesired fluid is water.

4. The method as defined in claim 1 wherein the undesired fluid is gas.

5. The method as defined in claim 1 wherein the mobility-reducing fluid is an aqueous solution containing a thickening agent.

6. The method as defined in claim 1 wherein the mobility-reducing agent is water.

7. The method as defined in claim 1 wherein the mobility-reducing agent is oil.

8. A method of reducing water coning in the production of oil from a wellbore in a subterranean formation having a first zone substantially saturated with oil and an adjacent second zone substantially saturated with water, a portion of the second zone having a permeability which is less than the average permeability of the formation comprising:
(a) establishing fluid communication between the wellbore and the first zone;
(b) establishing fluid communication between the wellbore and the second zone only at the low permeability portion of the second zone; and
(c) simultaneously producing oil from the first zone and limited quantities of water from the low permeability portion of the second zone.

9. The method as defined in claim 8 wherein the low permeability portion of the second zone has a permeability which is less than one-half the average permeability of the formation.

10. The method as defined in claim 8 wherein fluid communication between the wellbore and the low permeability portion of the second zone is established at a distance from the first zone which is no more than twice the distance between the point of fluid communication in the first zone and the second zone.

11. A method of reducing the production of an undesired fluid from a formation penetrated by a wellbore and at least partially saturated with an undesired fluid comprising:
(a) injecting a mobility-reducing fluid into the formation by means of the wellbore; and
(b) simultaneously withdrawing the desired fluid, the undesired fluid and the mobility-reducing fluid from the formation by means of the wellbore.

References Cited
UNITED STATES PATENTS

| | | | |
|---|---|---|---|
| 2,731,414 | 1/1956 | Binder et al. | 166—10 X |
| 2,784,787 | 3/1957 | Matthews et al. | 166—42 X |
| 2,788,855 | 4/1957 | Peterson | 166—42 |
| 2,827,964 | 3/1958 | Sandiford et al. | 166—9 |
| 2,889,880 | 6/1959 | Hughes | 166—42 X |
| 3,093,192 | 6/1963 | Allen | 166—42 X |
| 3,123,140 | 3/1964 | Connally | 166—42 |
| 3,195,633 | 7/1965 | Jacob | 166—42 |
| 3,386,514 | 6/1968 | Weber | 166—42 |

STEPHEN J. NOVOSAD, Primary Examiner